United States Patent Office 2,882,272
Patented Apr. 14, 1959

2,882,272
VAT DYESTUFFS

Hans Schlichenmaier, Bad Soden (Taunus), and Heinrich Pohlmann, Frankfurt am Main, Germany, assignors to Farbwerke Hoechst Aktiengesellschaft vormals Meister Lucius & Bruning, Frankfurt am Main, Germany, a corporation of Germany No Drawing. Application January 26, 1955
Serial No. 484296

Claims priority, application Germany February 4, 1954

3 Claims. (Cl. 260—275)

The present invention relates to new vat dyestuffs of the benzanthrone-pyrazoleanthrone series; more particularly it relates to dyestuffs corresponding to the general formula:

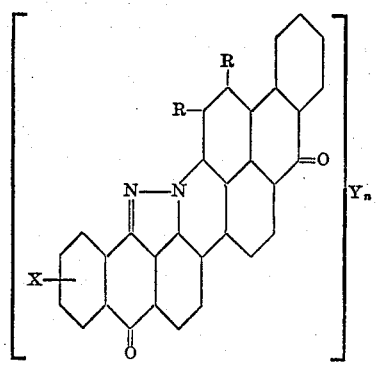

wherein one R represents a lower alkyl group and the other R represents hydrogen, X stands for hydrogen or chlorine, Y stands for hydrogen, chlorine or bromine and n means a numeral ranging from 0.5 to 2.

In German Patent No. 490,723 there is described inter alia a process for the manufactutre of a blue vat dyestuff, the Bz-2-phenyl-benzanthrone-pyrazoleanthrone. Corresponding dyestuffs containing an alkyl group in the Bz-nucleus have hitherto not been disclosed in literature.

Now we have found that vat dyestuffs of the benzanthrone-pyrazoleanthrone series containing an alkyl group in the Bz-nucleus can be obtained by melting N(1)-(Bz-1'-benzanthronyl) - pyrazoleanthrones containing an alkyl group in the Bz-nucleus in known manner with alkaline condensing agents and, if desired, treating the dyestuffs so obtained with halogenating agents.

The new dyestuffs yield on cotton or viscose rayon violet to blue dyeings which are distinguished by a very good fastness to chlorine and good general fastness properties.

The N(1)-(Bz-1' - benzanthronyl)pyrazole - anthrones containing alkyl group in the Bz-nucleus which are used as parent materials can be obtained by condensing, at a raised temperature, preferably at a temperature of about 120°–150° C., pyrazole-anthrones with Bz-1-chloro-Bz-alkylbenzanthrones in alkylformamides in the presence of acid-binding agents.

The following examples serve to illustrate the invention, but they are not intended to limit it thereto; the parts being by weight:

Example 1

20 parts of N(1)-(Bz-1'-(Bz-2'-ethyl)-benzanthronyl)-pyrazole-anthrone melting at 363° C., which is obtainable by reacting pyrazole-anthrone with Bz-1-chloro-Bz-2-ethylbenzanthrone in dimethylformamide at a raised temperature in the presence of potassium carbonate, are introduced at 90° C. into a melt of 25 parts of caustic potash and 30 parts of ethanolamine, and the mixture is stirred for one hour at this temperature. The melt is then poured into a mixture of 150 parts of ice and 150 parts of water, while blowing air into the reaction mixture until oxidation of the leuco compound of the dyestuff is complete. The dyestuff is then filtered off, washed while hot until a neutral reaction is obtained, dried and recrystallized from concentrated sulfuric acid. The dyestuff so purified dyes cotton from a blue vat reddish blue tints of good wet fastness properties and a very good fastness to chlorine and to light. It corresponds to the following formula:

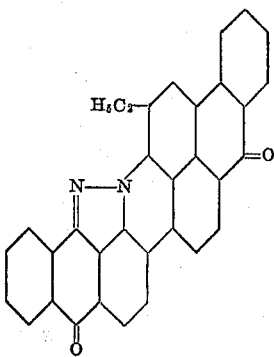

Example 2

When in Example 1 the Bz - 2' - ethyl - benzanthronyl-pyrazole-anthrone is replaced by 20 parts of N(1)-(Bz-1'-(Bz-2'-ethyl)-benzanthronyl) - 8-chloropyrazoleanthrone melting at 369° C., which is obtainable by reacting 8-chloropyrazoleanthrone with Bz-1-chloro-Bz-2-ethylbenzanthrone in dimethylformamide at boiling temperature in the presence of potassium carbonate, and the reaction product is worked up as described in Example 1, a dyestuff is obtained which dyes cotton from a clear blue vat slightly greener tints than the dyestuff described above. Its fastness properties are similar to those of the product described in Example 1.

Example 3

When in Example 1 the Bz-2-ethyl-benzanthronyl-pyrazole-anthrone is replaced by 20 parts of N(1)-(Bz-1'-(Bz-2'-methyl)-benzanthronyl)-pyrazoleanthrone melting at 374° C., a dyestuff is obtained which dyes cotton from a blue vat bluish-violet tints of good fastness properties, especially a good fastness to chlorine.

Example 4

A solution of 1.2 parts of sodium chlorate in 100 parts of water is added dropwise, while stirring, within 3 hours, at 20° C. to a suspension of 5 parts of the dyestuff described in Example 1 in the form of a paste of 10 percent strength in 50 parts of water and 100 parts of concentrated hydrochloric acid. The reaction mixture is then filtered off, washed until neutral and standardized to a paste of 10 percent strength. The new dyestuff so obtained which contains about 1 chlorine atom per dyestuff molecule dyes cotton slightly greener tints than that described in Example 1 and is distinguished by good fastness properties, especially by a good fastness to chlorine.

If the chlorination is carried out at a temperature of 80° C. instead of at 20° C., a dyestuff is obtained which contains about 2 chlorine atoms per molecule. It dyes cotton somewhat greener tints and has the same fastness properties.

Example 5

The dyestuff described in Example 2 is chlorinated at 20° C. with sodium chlorate and hydrochloric acid as described in Example 4. A new dyestuff is obtained which contains a further ½ chlorine atom per molecule and dyes cotton somewhat greener tints than the original dyestuff. The fastness properties, especially its fastness to chlorine, are good.

*Example 6*

If the dyestuff described in Example 3 is chlorinated at 20° C. with sodium chlorate and hydrochloric acid as described in Example 4, a product is obtained which contains about 0.7 chlorine atom per molecule. The new dyestuff yields considerably greener dyeings than the product which is free from chlorine. The fastness properties are good.

*Example 7*

4 parts of the dyestuff described in Example 3 are dissolved at the boil in 40 parts of nitrobenzene. The solution is cooled to 70° C. and, after the addition of 0.1 part of iodine, 4 parts of sulfuryl chloride are added dropwise within 1½ hours. The reaction mixture is stirred for 4 hours at 70° C. and is then allowed to stand overnight. The dyestuff which has separated in the form of crystals is then filtered off, washed with nitrobenzene and alcohol, and dried. It contains about 2 chlorine atoms per dyestuff molecule and dyes cotton considerably greener tints than the non-chlorinated dyestuff. Its fastness properties, especially its fastness to chlorine, are good.

*Example 8*

When in Example 1 the Bz-2-ethylbenzanthronyl-pyrazoleanthrone is replaced by 20 parts of N(1)-(Bz-1'-(Bz-2'-isopropyl)-benzanthronyl)-pyrazoleanthrone melting at 351° C., which is obtainable by reacting pyrazoleanthrone with Bz-1-chloro-Bz-2-isopropyl-benzanthrone in dimethylformamide at boiling temperature in the presence of potassium carbonate, a dyestuff is obtained which dyes cotton from a blue vat clear greenish-blue tints of good fastness properties, especially of a good fastness to chlorine.

*Example 9*

4 parts of the dyestuff described in Example 8 are dissolved in 80 parts of nitrobenzene. 0.1 part of iodine is then added to the solution as a catalyst and 4 parts of sulfuryl chloride are added dropwise, within one hour, at 70° C., and the reaction mixture is stirred for further 4 hours at that temperature. After cooling, the dyestuff is filtered off, washed with nitrobenzene and methanol and dried. The dyestuff so obtained contains about 2 chlorine atoms per dyestuff molecule. It dyes cotton from a clear blue vat clear reddish-blue tints. Its fastness properties, especially its fastness to chlorine, are good.

The dyestuff corresponds to the following formula:

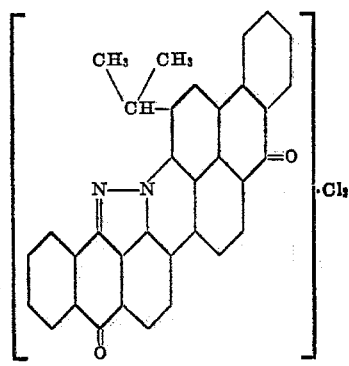

*Example 10*

4 parts of N(1)-(Bz-1'-(Bz-2'-isopropyl)-benzanthronyl)-8-chloropyrazoleanthrone are introduced at 60° C.

into a melt of 25 parts of caustic potash and 30 parts of ethanolamine. The temperature is slowly raised to 80° C. within 2½ hours, and the melt is then introduced into water. The dyestuff is worked up and purified as described in Example 1. It dyes cotton from a clear blue vat clear greenish blue tints which are greener than those produced with the dyestuff described in Example 8.

The fastness properties, especially the fastness to chlorine, are very good.

*Example 11*

When in Example 1 the Bz-2-ethyl-benzanthronyl-pyrazoleanthrone is replaced by 20 parts of N(1)-(Bz-1' (Bz-3'-methyl)-benzanthronyl)-pyrazoleanthrone, which forms yellow crystals melting at about 320° C., and the reaction product is worked up as described in Example 1, a dyestuff is obtained which dyes cotton from a clear blue vat considerably more reddish blue tints than the dyestuff described in Example 8. The dyestuff is distinguished by a good fastness to washing.

*Example 12*

4 parts of the dyestuff described in Example 11 are dissolved, while stirring, in 70 parts of chlorosulfonic acid and 0.1 part of iodine is added to the solution. After heating to 50° C., 2 parts of bromine dissolved in 10 parts of chlorosulfonic acid are introduced dropwise at 40°–50° C. within 5 hours. The clear violet solution is then cooled to about 5°–10° C. and diluted at that temperature with 78 parts of sulfuric acid of 50 percent strength, while stirring. The crystals which have separated are filtered off with suction, washed first with sulfuric acid of 80 percent strength and then with water until neutral. The dyestuff so obtained contains about 1.5 bromine atoms per molecule; it dyes cotton from a clear blue vat somewhat greener tints than the dyestuff described in Example 11 and is distinguished by a good fastness to washing.

We claim:

1. The dyestuff corresponding to the following formula:

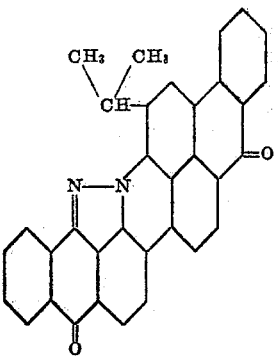

2. The dyestuff corresponding to the following formula:

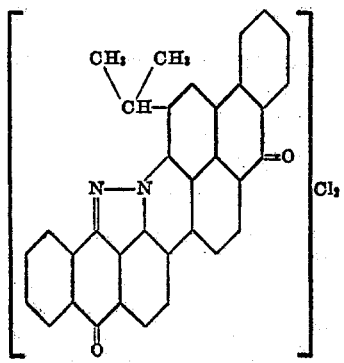

3. The dyestuff corresponding to the following formula:
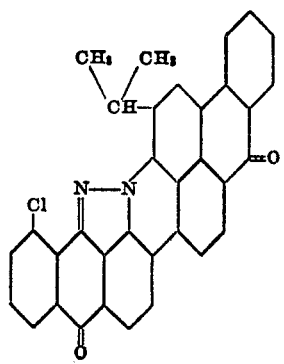
References Cited in the file of this patent
UNITED STATES PATENTS
| | | |
|---|---|---|
| 1,846,121 | Kunz | Feb. 23, 1932 |
| 1,846,122 | Kunz | Feb. 23, 1932 |
| 2,647,899 | Randall | Aug. 4, 1953 |